United States Patent [19]

Rosenberg

[11] Patent Number: 5,417,112
[45] Date of Patent: May 23, 1995

[54] APPARATUS FOR INDICATING THE PASSAGE OF A PIG MOVING WITHIN AN UNDERGROUND PIPELINE

[75] Inventor: Jeffrey S. Rosenberg, Tulsa, Okla.

[73] Assignee: TDW Delaware, Inc., Wilmington, Del.

[21] Appl. No.: 2,734

[22] Filed: Jan. 11, 1993

[51] Int. Cl.⁶ .............................................. G01S 1/74
[52] U.S. Cl. ..................................... 73/587; 324/226; 324/207.22; 367/118
[58] Field of Search ................. 73/622, 623, 587, 609, 73/610; 367/118; 324/226, 207.11, 207.24, 207.22

[56] References Cited

U.S. PATENT DOCUMENTS

| | | | |
|---|---|---|---|
| 2,092,951 | 9/1937 | Blake | 175/183 |
| 2,201,311 | 5/1940 | Halliburton | 181/0.5 |
| 2,558,977 | 7/1951 | Pearson | 15/104.06 |
| 2,601,248 | 6/1952 | Brenholdt | 175/183 |
| 2,601,249 | 6/1952 | Brenholdt | 175/183 |
| 2,820,959 | 1/1958 | Bell | 340/282 |
| 3,597,680 | 8/1971 | Hadden | 324/67 |
| 3,754,275 | 8/1973 | Carter et al. | 346/1 |
| 3,878,453 | 4/1975 | Potter et al. | 324/3 |
| 3,975,735 | 8/1976 | McCullough et al. | 343/112 R |
| 4,206,511 | 6/1980 | Ries et al. | 367/96 |
| 4,590,799 | 5/1986 | Brown et al. | 73/432 R |
| 4,714,888 | 12/1987 | French et al. | 324/326 |
| 4,857,851 | 8/1989 | Anderson et al. | 324/326 |
| 4,953,144 | 8/1990 | Chin et al. | 367/135 |
| 4,982,381 | 1/1991 | Mari | 367/27 |
| 5,031,151 | 7/1991 | Fifield et al. | 365/195 |
| 5,252,918 | 10/1993 | Van Berg et al. | 324/207.19 |

Primary Examiner—Hezron E. Williams
Assistant Examiner—Rose M. Finley
Attorney, Agent, or Firm—Head & Johnson

[57] ABSTRACT

Two geophones located above an underground pipeline are spaced from each other and adjacent to both sides of a benchmark location. As a pig travels through the pipeline sound waves are generated. As a pig approaches a benchmark location, sound waves are received first by the geophone which is closest to the source of the sound waves, that is, the upstream geophone and then by the downstream geophone. The geophones generate electrical signals that are fed to a comparator circuit which is connected to upstream and downstream indicators, one of which is activated when a pig passes the benchmark depending on whether the sound was first received by the upstream or downstream geophone. An alternate embodiment adds a magnetometer at the benchmark location capable of sensing changes in the ambient magnetic field caused by the passage of a pig.

21 Claims, 3 Drawing Sheets

APPARATUS FOR INDICATING THE PASSAGE OF A PIG MOVING WITHIN AN UNDERGROUND PIPELINE

BACKGROUND OF THE INVENTION

1. Field of the Invention

The present invention is a device for sensing and indicating the passage of a pig through a pipeline. The device is attached to a strip recorder capable of producing a stripchart which can be used in conjunction with a chart produced by an intelligent recording pig to map the interior of the pipeline in order to precisely locate defects in the pipeline.

2. Description of the Related Art

Early pipeline pigs were crude devices employed for such simple tasks as scrapping crud from the walls of a pipeline or traveling between consecutive products as the products moved through a pipeline, serving as a partition to reduce commingling of the products at their interface.

However, modern pipeline pigs contain highly sophisticated instruments and recording equipment and, therefore, are commonly referred to as "intelligent" pigs. These intelligent pigs are able to sense and record internal features of the pipeline which they encounter as they travel through the pipeline. These features include such things as welds which connect the pipeline segments together to form the pipeline and anomalies, such as dents or damaged places in the pipeline.

One goal in using the information obtained by the intelligent pig is to link a physical benchmark location, selected on the soil surface above the pipeline, with a point in the data recorded by the pig. When this linkage can be made, workmen can dig at the precise location to reach the point within the pipeline requiring attention, thus, saving time and money in unnecessary digging and searching. Another goal is to be able to monitor the pig as it moves through the pipeline in order to determine whether the pig is approaching or traveling away from a particular point. This information is useful in various situations, but particularly useful when the pig must be retrieved from the pipeline at a particular point on the pipeline and crews must be notified prior to the arrival of the pig at that point so that they will be available to retrieve the pig.

Magnetometers have been made to detect passage of a pig as shown, for example, by U.S. Pat. No. 4,714,888 issued on Dec. 22, 1987 to French et al. Use of a magnetometer provides one piece of information, the time of pig passage, that can be used to link a point in the pig data file to the surface benchmark location where the magnetometer is located. The pig passage time will be recorded on the pig data file and recorded on a stripchart attached to the magnetometer at the soil surface. In order to use these recorded pig passage times, the recorded times must be corrected for drift between the time source used at the surface and the time source used on the pig. This is typically done by recording the time the pig is launched and the time the pig is received for both time sources and then applying a linear correction factor to one of the time sources or references. However, the assumption of linear time drift is probably not accurate since most of the time drift is caused by temperature. The drift due to temperature can be reduced by using an oven controlled time source or by using a temperature compensated time source. However, if the pig run is longer than a few days, the time drift errors can be difficult to correct.

Once the time drift errors are addressed and a time of passage past the benchmark location is arrived at, this time can be referenced to an event or feature recorded by the pig. Intelligent instrumented pigs can either continuously record data, like a tape recorder or intermittently record data. The intermittent data recording technique typically records data when important information is gathered or on a periodic basis for various reasons. For pigs that continuously record data, the time of pig passage can be linked to an exact point in the pig's data record. For pigs that record data sporadically, an event recorded slightly before and an event recorded slightly after the passage of the pig must be found. The time of pig passage will be linked to the pig data by assuming an average pig velocity between the two events and then calculating a distance offset from one of the events based on the time difference between the event and the pig passage time. In general, the accuracy of the benchmark position in the pig data file is directly related to the time gap between the two events and the speed of the pig.

Geophones have been used to track and/or to detect passage of a pig as shown, for example, by U.S. Pat. No. 4,590,799 issued May 27, 1987 to Brown et al. Typically, geophones are used to listen to the sounds made by the pig as the pig moves in the pipeline. Most pigs make a noise as their cups cross a weld between pipe joints. The pig speed can be estimated by assuming pipe joints are 40 feet long, and by listening for the pig to cross the welds and counting the time required for the pig to cross several welds. Geophones are also used to detect pig passage by listening to the sound of the pig as the sound gets louder and then softer as the pig passes the listening location. The exact moment the pig is under the listening location is approximately the point at which the noise is the loudest.

By employing two geophones equally spaced apart around a benchmark location or by using a magnetometer and geophone combination, the present invention produces a benchmark system that performs much better than the simple sum of the individual parts, i.e. the magnetometer and the geophone benchmark system. If we simply added the magnetometer and geophone systems together we would have a system that accurately pinpoints the moment of pig passage (magnetometer) and also verifies that the pig is moving and has passed at an approximate time (geophone).

By employing a magnetometer in conjunction with the geophone system, the present invention records not only the time of the pig passage from the magnetometer signal, but also records the time of dozens of welds from the geophone signals on both sides of the pig passage time. Although the human ear can sometimes distinguish the sound of each pig cup crossing a weld (for pigs provided with a cup at each end of the pig), accurately timing these two (or more when more than two cups are provided on the pig) sounds would be almost impossible. The electronics in the present invention can be made sensitive and accurate enough to record the time each cup crosses a weld. This means that the electronics can record the time that the pig was within a few inches of a position (near a weld) in a pipeline. Most modern instrumented pigs record time and distance at least at each pipeline joint weld. The series of weld times recorded by the present invention are a virtual fingerprint of the pipeline since the sequence of pipe segment lengths are probably unique within the entire pipeline. The highly accurate time of pig passage below the magnetometer is used to give an approximate time to check for a match between the sequence of weld times recorded by the geophones and to determine the position of the benchmark location between adjacent welds. The weld times in the data recorded by the pig are aligned with the weld times recorded by the present invention. The time correction factor between the two time sources can be calculated. The time of pig passage is then linked with the data recorded by the pig.

One unexpected result of combining a magnetometer and a geophone is that the accuracy of the benchmark link to the recorded data is not directly related to the accuracy and stability of the time sources. This means the invention will work with easily obtainable time sources and work for pig runs of longer than a few days without loss of accuracy. Also, the benchmark location correlation between the present invention and the pig is better than any other benchmark technique now in use. The present invention can be made into a small hand carried, battery powered unit that is easy to use. And since only a magnet and time recording means are required in the instrumented pig, this invention can be used with virtually all instrumented pigs. Also because the signal received by the magnetometer is not dependent on pig speed, the magnetometer can detect pig passage very accurately and can detect pig passage even if the pipeline is buried much deeper than the normal three feet below the soil surface.

SUMMARY OF THE INVENTION

Briefly, one embodiment of the present invention is a pig location device employing two geophones which are positioned over a pipeline and are equally spaced away from a benchmark location. As the front and rear cups of a pig pass welds securing segments of the pipeline together, sound waves are generated which travel to the geophones. The time required for the sound waves to reach the geophones is dependent on the distance of the pig from that geophone at the time the sound was made. The geophones are connected to separate geophone amplifiers one of which feeds a headphone amplifier supplied with a headphone for listening to the sounds. The separate geophone amplifiers feed variable threshold comparators which filter out background noise and generate a digital signal at the peak of the signal from the geophone. The digital signals from each comparator are sent to the upstream and downstream one shot circuits which generate an output based on which geophone received the sound waves first. The geophone to first receive the sound waves is visually indicated when either the upstream or downstream one shot activates either attached upstream or downstream indicator. The geophone amplifiers are each also attached to a stripchart recorder which traces a pair of peaks associated with passage of the front and rear cups past each weld.

A second alternate embodiment adds a magnetometer above the pipeline at the benchmark location. The magnetometer senses passage of a magnet attached to an intelligent pig. The magnetometer connects to a magnetometer amplifier supplied with background magnetic field null control for amplifying the signal and filtering out magnetic background fields. The magnetometer amplifier connects to the stripchart recorder which traces disruption in the magnetic field as the pig passes the benchmark location. The magnetometer trace is recorded on the stripchart recorder along with the geophone traces.

A third alternate embodiment eliminates one of the geophones and relocates the other geophone adjacent the magnetometer so that both the magnetometer and the geophone are located at the benchmark location.

In all three embodiments, the geophone traces made on the stripchart recorder can be correlated with information recorded by the intelligent pig to locate various features, such as dents, in the pipeline. Depending on the specific embodiment, information on whether the pig is approaching or traveling away from the benchmark location is provided by either activation of upstream and downstream indicators, observing the relative positions of peaks on the two geophone traces on the stripchart recorder, or listening for volume increases and decreases of sound heard through the headphone. For those two embodiments which include the magnetometer, a magnetometer trace on the stripchart recorder pinpoints the benchmark location relative to the welds and other features of the pipeline.

Also, in all three embodiments, the stripchart recorder is provided with a temperature compensated time reference which can be used to mark time intervals on the stripchart recorder. These time intervals can be correlated with time intervals recorded by a temperature compensated time reference provided on the intelligent pig in order to determine the precise time the pig passes the benchmark location, a weld, or any other feature of the pipeline.

DETAILED DESCRIPTION OF THE PREFERRED EMBODIMENTS

Figure 1:
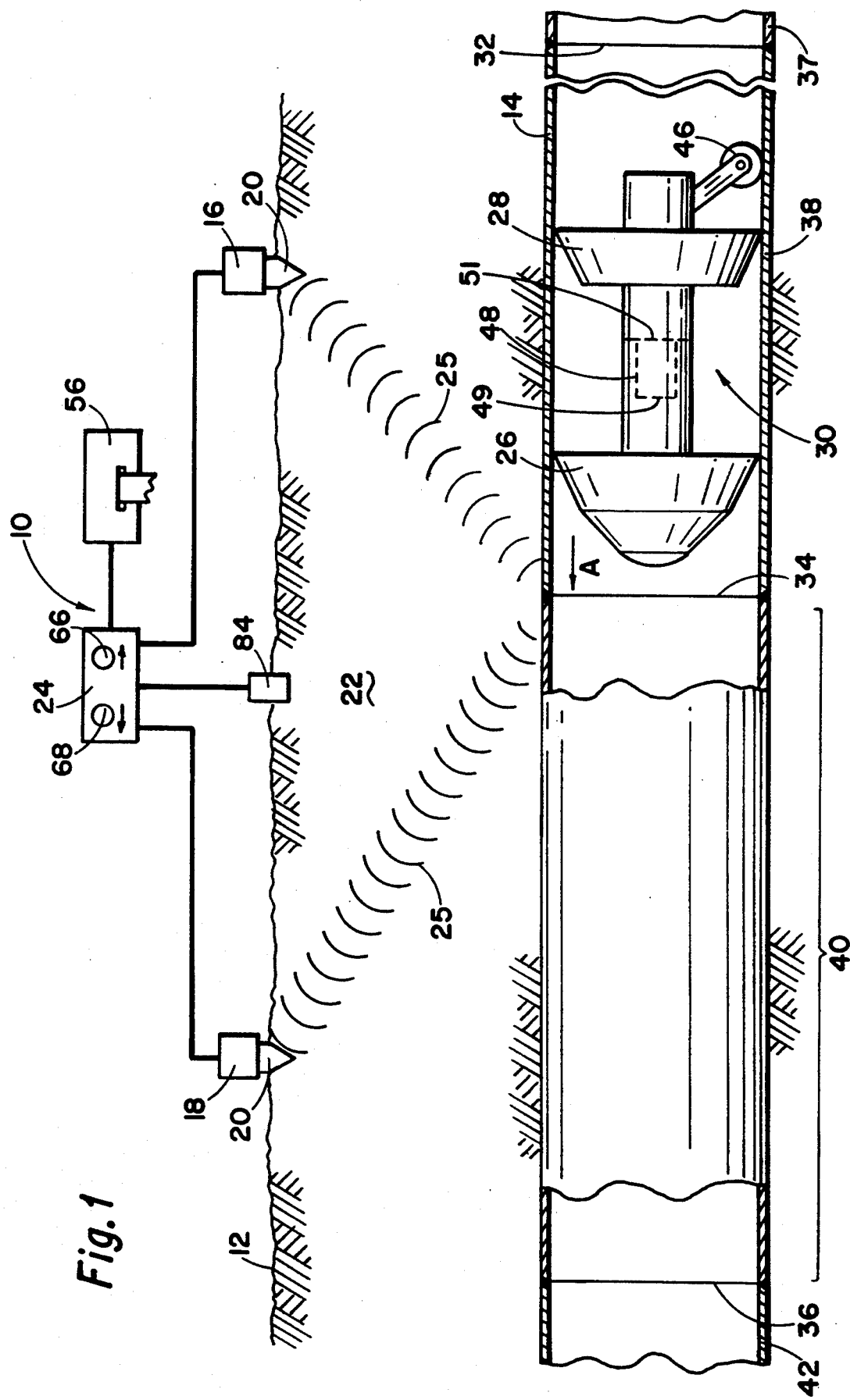
FIG. 1 is a side elevation showing a pig location device constructed according to a preferred embodiment of the present invention being located above an underground pipeline, with portions of the pipeline cut away to show a pig within the pipeline.

Referring now to the drawings and initially to FIG. 1, there is illustrated a pig location device 10 constructed according to a preferred embodiment of the present invention. The device 10 is positioned at a soil surface 12 above an underground pipeline 14.

The device 10 is provided with first and second geophones 16 and 18, each of which secures to the soil surface 12 by means of a spike 20 or other suitable means of attachment. The geophones 16 and 18 are located above the pipeline 14 with one on either side of a benchmark location 22, the benchmark location being a point above the pipeline 14 and above which a control box 24 for the device 10 is normally positioned. The geophones 16 and 18 are located approximately the same distance from the benchmark location 22. The geophones 16 and 18 are normally spaced apart from each other about 10 to 20 feet, although they can function equally well when spaced several hundred feet apart.

The geophones 16 and 18 receive sound waves 25 created by a front cup 26 and by a rear cup 28 provided on an intelligent pig 30 as the cups 26 and 28 pass welds (illustrated by welds 32, 34, and 36) which secure together pipe segments (illustrated by pipe segments 37, 38, 40 and 42) comprising the pipeline 14.

The intelligent pig 30 is normally provided with a recording means (not illustrated) for recording: (1) time intervals, (2) protrusions encountered, such as welds 32, 34 and 36 and dents (not shown) in the pipeline 14, and (3) distance traveled by the pig 30, as measured by a traveling wheel 46 provided on the pig 30. The traveling wheel rotatably engages the pipeline 14 as the pig 30 travels through the pipeline 14 and its rotation is recorded as distance traveled by the pig 30.

The pig 30 is also provided with a magnet 48 oriented so its north pole 49 faces toward the front cup 26 and its south pole 51 faces toward the rear cup 28.

Figure 2:
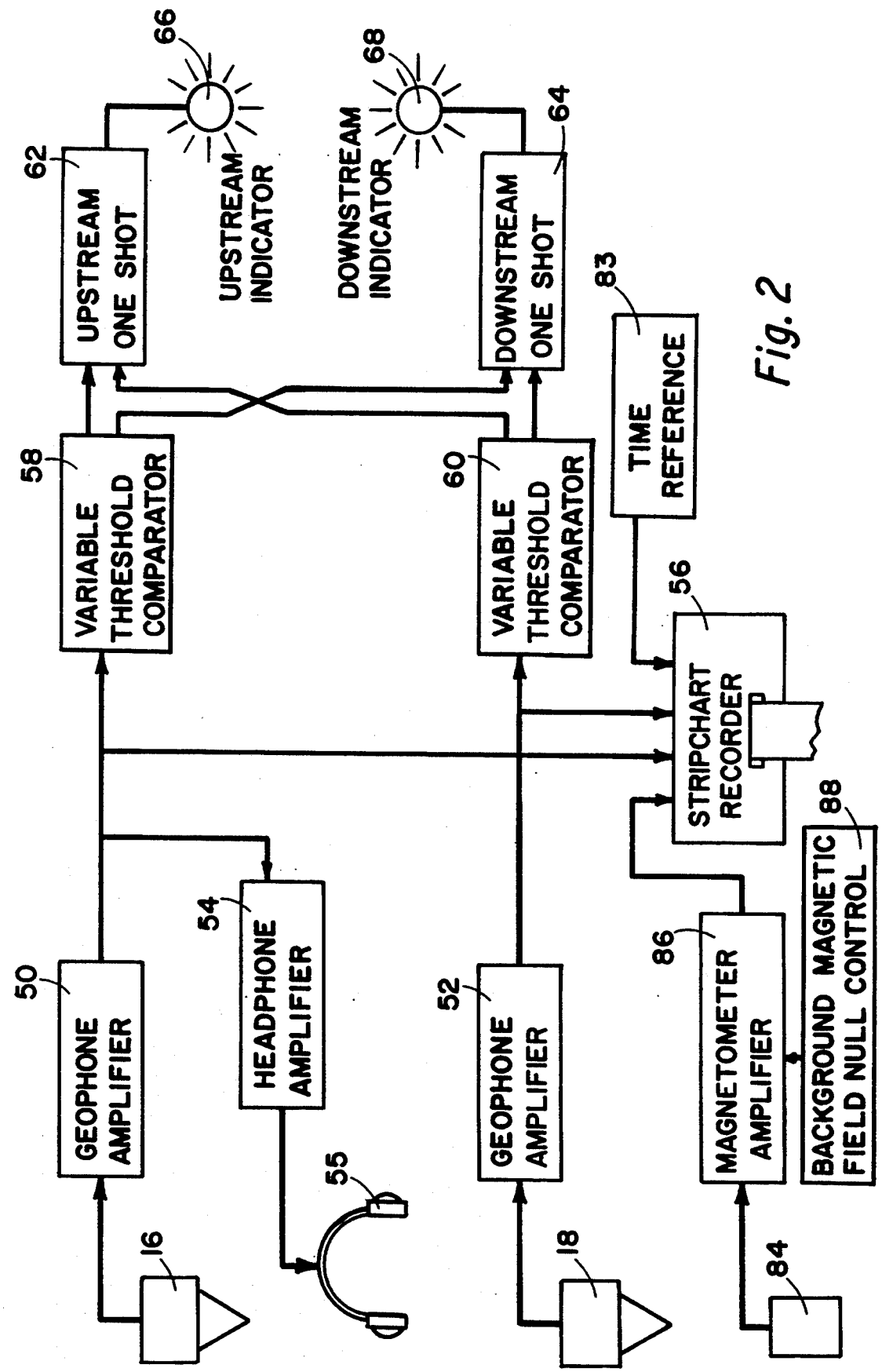
FIG. 2 is a diagram showing the components of the pig location device.

Referring now to FIG. 2, once the sound waves 25 are received by the first and second geophones 16 and 18 as illustrated in FIG. 1, the sound waves 25 travel respectively to first and second geophone amplifiers 50 and 52 which are attached to the geophones 16 and 18. The geophone amplifiers 50 and 52 amplify the sounds and send the amplified sounds to several places. The amplified sound from geophone amplifier 50 is sent to an attached headphone amplifier 54 which further amplifies the sound for audio monitoring by use of an attached headphone 55. The amplified sounds from geophone amplifiers 50 and 52 are both sent: (1) to an attached stripchart recorder and (2) to first and second variable threshold comparators 58 and 60 respectively from the first and second geophone amplifiers 50 and 52. The first and second variable threshold comparators 58 and 60 each are connected to an upstream one shot 62 and to a downstream one shot 64. The upstream and downstream one shots 62 and 64 are capable of activating respectively an attached upstream indicator 66 and a downstream indicator 68. In use, one of the geophones, either 16 or 18, functions as an upstream geophone and the other geophone, either 18 or 16, functions as a downstream geophone, depending on which direction the pig 30 approaches the benchmark location 22, i.e. the geophone located on the side from which the pig is approaching being designated as the upstream geophone.

For example, as illustrated in FIG. 1, when the pig 30 approaches the benchmark location 22 by traveling in the direction indicated by arrow "A", the first geophone 16 functions as the upstream geophone and the second geophone 18 functions as the downstream geophone. Similarly, if the pig 30 approached from the opposite direction, i.e. approached from the left side instead of the right side as illustrated in FIG. 1, the second geophone 18 would function as the upstream geophone and the first geophone 16 would function as the downstream geophone. References hereinafter will be made to the upstream geophone 16 and to the downstream geophone 18 to indicate that the first geophone 16 is serving as the upstream geophone and the second geophone 18 is serving as the downstream geophone.

Because the sound waves 25 travel at a constant rate when traveling through a given medium, such as soil, as illustrated in FIG. 1, when the pig 30 is approaching the benchmark location 22, the sound waves 25 will reach the upstream geophone 16 before reaching the downstream geophone 18. The variable threshold comparators 58 and 60 filter out background noise and send an impulse to the upstream and downstream one shots 62 and 64 when the sound arrives at each geophone 16 and 18. Since the sound reached the upstream geophone 16 before the downstream geophone 18 the impulse from the upstream variable threshold comparator 58 will be sent to the one shots 62 and 64 before the impulse from the downstream variable threshold comparator 60 is sent to the one shots 62 and 64. The downstream one shot 64 will not turn the downstream indicator 68 on because the impulse from the upstream variable threshold comparator 58 was received before the impulse from the downstream variable threshold comparator 60. The upstream one shot 62 will turn the upstream indicator 66 on because the impulse from the upstream variable threshold comparator 58 was received before the impulse from the downstream variable threshold comparator 60. The upstream indicator 66, thus, indicates the pig 10 is located upstream, i.e. to the right of the benchmark location 22 as illustrated in FIG. 1. By listening via headphone 55, progressively increasing loudness of the sounds can be used to determine that the pig 30 is approaching the benchmark location 22. Similarly, when the pig 30 has passed beyond the benchmark location 22, the sound waves 25 then reach the downstream geophone 18 before reaching the upstream geophone 16, as indicated by activation of the downstream indicator 68. Activation of the downstream indicator 68 thus indicates the pig 30 is then beyond the benchmark location, i.e. located to the left of the benchmark location 22 on FIG. 1. Decreasing loudness heard through the headphones 55 indicates the pig is moving away from the benchmark location 22.

Obviously, noisy environments, such as those encountered near a highway, present background noise too loud to be filtered out by the variable threshold comparators 58 and 60. For this reason, when using the pig location device 10, the benchmark location must be selected to avoid extremely noisy environments.

Figure 3:
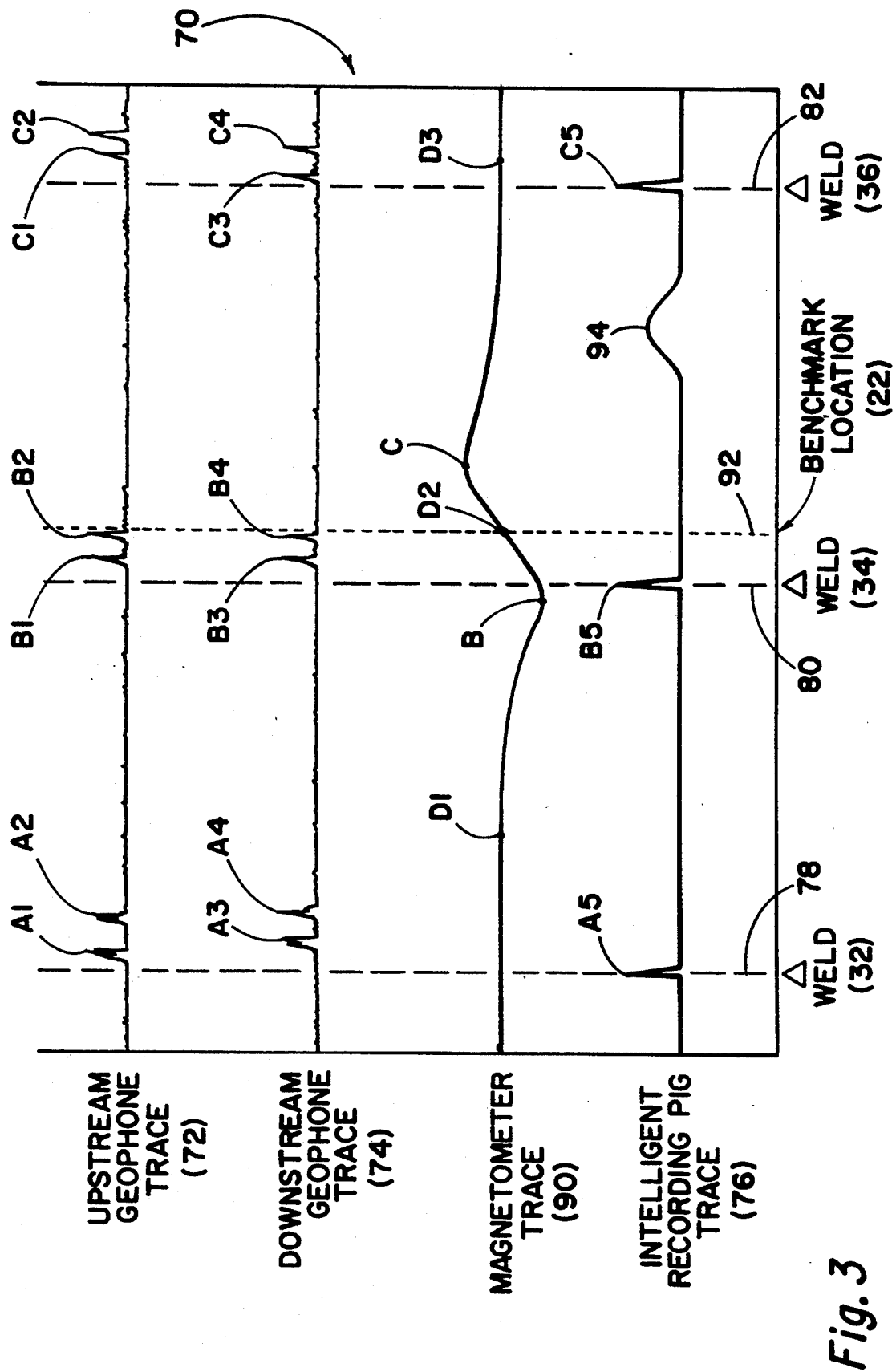
FIG. 3 is a composite chart which includes traces made by the pig location device and also includes a trace made by an intelligent recording pig.

FIG. 3 shows a composite stripchart 70 which combines data originating from the stripchart recorder 56 and from the recording means (not shown) on board the intelligent pig 30. In actuality, two individual stripcharts are produced, one by the device 10 and one by the pig 30. The composite stripchart of FIG. 3 is shown only for purposes of explanation on how the two stripcharts are used to correlate data from the separate stripcharts. Upstream geophone trace 72 and downstream geophone trace 74, the two uppermost traces appearing on the composite stripchart 70, are traces from the stripchart recorder 56 associated respectively with sound waves 25 received by the upstream geophone 16 and by the downstream geophone 18.

The X axis of stripchart 70 is time dependent so that things appearing to the left of the stripchart 70 are prior in time to things appearing to the right. Peaks A1 and A3, appearing respectively on traces 72 and 74, are associated with passage of the front cup 26 past weld 32 as heard respectively on the upstream and downstream geophones 16 and 18, and peaks A2 and A4, appearing respectively on traces 72 and 74, are associated with passage with the rear cup 28 past weld 32 as heard respectively by the upstream and downstream geophones 16 and 18. Likewise, peaks B1 and B3, and C1 and C3 are associated with passage of the front cup 26 past welds 34 and 36 as heard respectively by upstream and downstream geophones 16 and 18. Also, peaks B2 and B4, and C2 and C4 are associated with passage of the rear cup 28 past welds 34 and 36 as heard respectively by the upstream and downstream geophones 16 and 18. Peak A1 is to the left of peak A2 on the composite stripchart 70, therefore indicating that the front cup 26 passed weld 32 prior to passage of the rear cup past weld 32. Likewise, A3 and A4, B1 and B2, B3 and B4, C1 and C2, and C3 and C4 are similarly positioned relative to each other.

The peaks A1 and A3 associated with the passage of the front cup 26 past the weld 32 occur on the stripchart 70 slightly after, i.e. to the right of, dashed vertical line 78 which is drawn through peak A5 located on intelligent recording pig trace 76. Peak A5 was recorded by the pig 30 as it encountered weld 32. Peaks B1 and B3 are similarly associated with dashed vertical line 80 which is drawn through peak B5 located on intelligent recording pig trace 76, and peaks C1 and C3 are similarly associated with dashed vertical line 82 which is drawn through peak C5 located on intelligent recording pig trace 76. Peak B5 and peak C5 were recorded by the pig 30 as it encountered respectively welds 34 and 36.

The delay between encounter by the pig 30 of the welds 32, 34 and 36 and occurrence of peaks A1, A3, B1, B3 C1 and C3 is due to the time required for the sound waves 25 to travel to the geophones 16 and 18 once the front cup 26 has passed the welds 32, 34 and 36. Similarly, the peaks A2, A4, B2, B4, C2 and C4 are likewise displaced to the right on the stripchart 70 due to the time required for the sound waves 25 to travel to geophones 16 and 18 once the rear cup 28 has passed the welds 32, 34 and 36. Because the sound waves 25 travel at a fairly constant rate, the relative distances peaks A1-A4, B1-B4, and C1-C4 are located from each other and from vertical lines 78, 80 and 82 can be correlated with distances the pig 30 is located from the geophones 16 and 18 at various times.

By comparing the position of peaks A1 and A3 relative to vertical line 78 and, therefore, to weld 32, it can be determined that the pig is closer to the upstream geophone 16 than the downstream geophone 18 when it passes weld 32. This can be determined because peak A1 is closer than peak A3 to the dashed line 78 which correlates with the actual location of weld 32. Thus, the pig 30 must be located to the right of benchmark location 22.

Likewise, peaks B1 and B3 are approximately equally spaced from dashed line 80 associated with the actual location of weld 34, indicating the pig 30 is approximately half way between the upstream and downstream geophones 16 and 18. This situation only occurs when the pig 30 is approximately below benchmark location 22. Because the benchmark location 22 may not be aligned with the nearest weld 34, the peaks B1 and B3 (and also B2 and B4) may only be approximately the same distance from dashed line 80 instead of being exactly the same distance from dashed line 80.

Finally, peak C3 is closer than peak C1 to dashed line 82 associated with the actual location of weld 36, indicating the pig 30 has passed the benchmark location 22 and is now to the left of the benchmark location 22 as viewed from the perspective of FIG. 1.

As illustrated in FIG. 2, the stripchart recorder 56 can be provided with a temperature compensated time reference 83 for recording time intervals on the stripchart recorder 56. The pig 30 may also be provided with a temperature compensated time reference (not shown). These time intervals can be used along with geophone traces 72 and 74 to correlate the data obtained by the pig 30 and data obtained by the pig location device 10.

As shown in FIG. 1, a second embodiment of the present invention adds a magnetometer 84. In this embodiment, the magnetometer 84 is located at the benchmark location 22 and is held in a stationary position either by virtue of resting firmly against the soil surface 12 or by virtue of being partially buried in the soil surface 12. It is important that the magnetometer be held stationary as movement of the magnetometer can cause erroneous readings. The magnetometer 84 senses the magnetic field component at a right angle from soil surface 12 that is associated with the magnet 48 provided on the pig 30. As shown in FIG. 2, the magnetometer 84 connects to a magnetometer amplifier 86 provided with a background magnetic field null control 88. The background magnetic field null control 88 filters out magnetic background noise caused by such things as the earth's magnetic field (not shown). However, automobiles (not shown) traveling close to the benchmark location can create magnetic interference which cannot be effectively filtered out. Therefore, for this reason and because of the noise problems discussed earlier, a benchmark location must be selected for the pig location device 10 which avoids areas near highways. Once the magnetic background noise is filtered out, the magnetometer amplifier 86 amplifies and sends a signal to the stripchart recorder 56 where a magnetometer trace 90 is created.

As shown in FIG. 3, the magnetometer trace 90 results from passage of the pig 30 past the benchmark location 22 where the magnetometer 84 is located. The magnetometer trace 90 is normally horizontal, as depicted by horizontal, position points D1, D2, and D3, with point D1 being located on the magnetometer trace 90 prior to disruption of the magnetic field, point D2 being located on the magnetometer trace 90 at a point half way through disruption of the magnetic field caused by passage of the pig 30, and point D3 being located on the magnetometer trace 90 after disruption of the magnetic field has ended. However, when the magnetometer 84 senses a change in magnetic field, either toward a north or south orientation, the magnetometer trace 90 is disturbed. The magnetometer trace 90 moves in a negative direction, from point D1 to point B, if the magnetic field changes to a more northerly orientation. The magnetometer trace 90 moves in a positive direction, from point D1 to point C, if the magnetic field changes to a more southerly orientation. During disruption of the magnetic field, the magnetometer trace 90 drops to a point B below its normal horizontal position, as depicted by points D1, D2 and D3, in response to a northerly change in the magnetic field, as when the north pole 49 of the magnet 48 is approaching the benchmark location 22. Similarly, the trace 90 extends upward to a point C above its normal horizontal position, illustrated by points D1, D2 and D3, in response to a southerly change in the magnetic field, as when the trailing south pole 51 of the magnet 48 is moving away from the benchmark location 22.

Points B and C are centered around a point D2 which is equal in magnitude to points D1 and D3, i.e. located horizontally from each other on the composite stripchart 70. A dashed line 92 drawn through point D2 will intersect the X axis of composite stripchart 70 at a point which correlates with a relative location of the benchmark location 22 with regard to locations of the welds 32, 34, and 36 as shown on FIG. 3. At point D2 the magnet 48 in the pig 30 is directly below the benchmark location 22 where the magnetometer 84 is located so that positive and negative magnetic forces being exerted on the magnetometer 84 by the magnet 48 located in the pig 30 cancel each other out. By correlating polarity of the magnet 48 used in the pig 30 with the magnetometer trace 90, the direction "A" of travel of the pig 30 can be ascertained from the magnetometer trace 90.

Referring now to intelligent recording pig trace 76 in FIG. 3, there is a bump 94 which corresponds with a dent (not shown) in the pipeline 14 occurring in pipe segment 40 located between weld 34 and weld 36. By referring to welds 34 and 36 as reference points, the dent (not shown) or other similar feature can be precisely located in the pipeline 14 without unnecessary digging and searching.

Another embodiment of the present invention relocates the first geophone 16 adjacent the magnetometer 84 and eliminates the second geophone 18. This embodiment allows the welds, illustrated by welds 32, 34 and 36, to be mapped in order that features (not shown) of the pipeline 14 can be located. This embodiment employs the headphone 56 to indicate by increasing volume the approach of the pig 30 toward the benchmark location 22 or to indicate by decreasing volume the movement of the pig 30 away from the benchmark location 22.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A pig location device for use in locating a pig within an underground pipeline, comprising:
   an upstream geophone and a downstream geophone each located above the pipeline, said geophones being located on either side of a benchmark location and adjacent to benchmark location;
   said geophones being connected to comparator means for indicating which geophone first received sound waves generated by the pig as cups provided on the pig pass welds in the pipeline;
   said geophones being connected to recording means in order to record the sound waves received by each geophone.

2. A pig location device according to claim 1 further comprising a time reference being connected to the recording means in order to record time intervals.

3. A pig location device according to claim 1 further comprising said geophones being connected to a headphone for listening to sounds received as sound waves by the geophones.

4. A pig location device according to claim 3 further comprising amplifying means being connected between the geophones and the headphones.

5. A pig location device according to claim 1 wherein the comparative means for indicating which geophone first received the sound waves comprises:
   a variable threshold comparator attached to each geophone by a geophone amplifier, each said variable threshold comparators being connected to an upstream one shot and a downstream one shot, said upstream one shot connected to and capable of activating an upstream indicator in response to sound waves being first received by the upstream geophone, said downstream one shot connected to and capable of activating a downstream indicator in response to sound waves being received first by the downstream geophone.

6. A pig location device according to claim 1 wherein the recording means is a stripchart recorder.

7. A pig location device according to claim 1 further comprising a geophone amplifier being connected to each geophone between the geophone and the comparator means and between the geophone and the recording means.

8. A pig location device according to claim 1 further comprising a magnetometer being provided at the benchmark location for sensing changes in a magnetic field upon passage of a pig, said magnetometer being connected to the recording means in order to record changes in a magnetic field sensed by the magnetometer.

9. A pig location device according to claim 8 wherein the recording means is a stripchart recorder.

10. A pig location device according to claim 8 further comprising a magnetometer amplifier being connected to the magnetometer between the magnetometer and the recording means.

11. A pig location device according to claim 8 further comprising a time reference being connected to the recording means in order to record time intervals.

12. Apparatus for indicating the passage of a pig moving within an underground pipeline past a benchmark location, comprising:
   an upstream geophone and a downstream geophone each located above the pipeline, said geophones being located on either side of and adjacent to a benchmark location, each geophone being sensitive to sound generated by movement of the pig in the pipeline; and
   said geophones being connected to circuit means for indicating which of said geophones first received sound waves generated by a pig passing said benchmark.

13. Apparatus according to claim 12 including indicator means connected to said circuit means for indicating which of said geophones first received sound waves generated by a pig passing said benchmark to thereby indicate the direction of movement of the pig.

14. Apparatus according to claim 12 wherein at least one of said geophones is connected to a headphone for listening to sounds received by said at least one of said geophones.

15. Apparatus according to claim 14 further comprising amplifying means connected between said at least one said geophone and said headphones.

16. Apparatus according to claim 12 wherein said circuit means for indicating which said geophone first received sound waves generated by the passage of the pig, comprising:
   a variable threshold comparator attached to each said geophone, each said variable threshold comparator being connected to an upstream one shot circuit means and a downstream one shot circuit means, said upstream one shot circuit means being connected to and capable of activating an upstream indicator in response to sound waves being first received by one of said geophones, said downstream one shot circuit means being connected to and capable of activating a downstream indicator in response to sound waves being received by the other of said geophones.

17. Apparatus according to claim 12 including a recording means connected to at least one of said geophones to record received sound waves.

18. Apparatus according to claim 12 further comprising a magnetometer positioned at the benchmark location for sensing changes in a magnetic field upon passage of the pig, said magnetometer being connected to a recording means in order to record changes in a magnetic field sensed by said magnetometer.

19. Apparatus according to claim 17 including a time reference means connected to said recording means in order to record time intervals.

20. A system for use in locating a pig within an underground pipeline, comprising:
an upstream geophone and an adjacent downstream geophone each located above the pipeline;
said geophones being connected to a comparator means for indicating which geophone first received sound waves generated by the pig, wherein said comparator means is in the form of a variable threshold comparator attached to each said geophone, each said variable threshold comparator being connected to an upstream one shot and a downstream one shot, said upstream one shot being connected to and capable of activating an upstream indicator in response to sound waves being first received by said upstream geophone, said downstream one shot connected to and capable of activating a downstream indicator in response to sound waves being received first by said downstream geophone.

21. A system for use in locating a pig within an underground pipeline, comprising:
an upstream geophone and a downstream geophone each located above the pipeline, said geophones being located on either side of and adjacent a benchmark location;
said geophones being connected to comparator means for indicating which geophone first received sound waves generated by the pig;
at least one of said geophones being connected to a recording means to record sound waves received by said at least one geophone; and
a magnetometer provided at the benchmark location for sensing changes in a magnetic field upon passage of a pig, said magnetometer being connected to said recording means to record changes in a magnetic field sensed by the magnetometer in response to the passage of the pig.

* * * * *